United States Patent [19]
Schmidt

[11] 3,947,045
[45] Mar. 30, 1976

[54] ROTARY SEALING MEANS

[75] Inventor: Wayne E. Schmidt, Scottsdale, Ariz.

[73] Assignee: The Garrett Corporation, Los Angeles, Calif.

[22] Filed: Dec. 5, 1974

[21] Appl. No.: 529,643

[52] U.S. Cl. ................................................ 277/87
[51] Int. Cl.² ........................................ F16J 15/38
[58] Field of Search ............ 277/40, 41, 42, 43, 87, 277/86, 88, 90

[56] References Cited
UNITED STATES PATENTS
2,407,218  9/1946  Beier .................................... 277/40

FOREIGN PATENTS OR APPLICATIONS
574,583  3/1958  Italy ...................................... 277/43

Primary Examiner—Robert I. Smith
Attorney, Agent, or Firm—Herschel C. Omohundro; James W. McFarland; Albert J. Miller

[57] ABSTRACT

This rotary sealing means has a casing with spaced concentric inner and outer walls connected by an end wall, the latter having a shoulder adjacent the inner wall. A primary sealing element, composed of carbon or the like, is guided for nonrotative movement between the inner and outer walls, such element having a counterbore which forms a shoulder opposed to and spaced from the shoulder in the casing. A secondary sealing element is disposed in the space between the shoulders, such secondary element in one form of the invention being annular and having a plastic part of generally channel-shaped cross section with the open side facing inwardly so that fluid pressure applied thereto will tend to urge the flaps of the channel toward the shoulders. Spring means are also positioned between the flaps of the channel to initially urge the flaps toward the shoulders. Variations in the plastic channel and spring means may be provided to extend the usefulness of the seal.

13 Claims, 4 Drawing Figures

ROTARY SEALING MEANS

BACKGROUND OF THE INVENTION

This invention relates to seals and more particularly to those employed to seal an opening in a wall through which a shaft or other movable element of a machine extends. It has long been a problem with machinery to prevent the escape fluid under pressure around an element projecting through a casing wall, particularly when the element is movable relative to the wall, like a rotating shaft. In this instance it is proposed to provide a first seal having a primary sealing face and another or secondary seal with one or more sealing faces, all the seals sealing axially. Heretofore, seals provided for use in locations such as the seal of this invention have had a combination of primary and secondary seals, the latter sealing radially which required larger size seals and a greater number of elements. In addition, the previously provided seals were unsatisfactory in that they wore out quicker and leaked excessively.

The seal of the present invention relates to the types of seals exemplified by the following U.S. Pat. Nos.:

2,422,007 to Gilbert
2,736,579 to Dickinson
3,025,069 to Harker
3,169,024 to Johnson et al
3,592,479 to Andresen

SUMMARY OF THE INVENTION

One of the objects of the present invention is to provide a seal assembly which will avoid the objections to prior seals by embodying a simpler construction, fewer parts, different operating principles, and a longer life.

Another object of the invention is to provide a seal assembly having a primary sealing element of a carbonaceous material and a secondary sealing element of a plastic material such as polytetrafluoroethylene, the secondary element having a construction which resists thermal expansion and flow of material when utilized in regions subjected to high temperatures.

Another object of the invention is to provide a seal assembly with a primary sealing element and a secondary sealing element so constructed and arranged as to eliminate problems usually attendant to the use of high expansion rate polytetrafluoroethylene, or similar plastics, by sealing on the relatively short axial length of the seal rather than the larger diametral dimension.

A further object of the invention is to provide a seal assembly with a primary sealing element and a secondary sealing element so constructed and arranged that the latter can be used to pressure balance the entire seal assembly and can be used for both internal or external pressure by facing the plastic element towards the high pressure.

Another object of the invention is to provide a seal assembly having a primary sealing element of a carbonaceous material with a face opposed to a shoulder on a shaft to be sealed and a secondary sealing element made from a polytetrafluoroethylene, or similar plastic, having an annular shape with a channel cross section, an annular resilient element being arranged in the channel and urging the sides of the channel outwardly toward shoulders on the primary seal and the seal assembly casing to yieldably hold the primary seal against the shaft shoulder. Fluid pressure applied to the inner surface of the secondary sealing element supplements the resilient element, or vice versa.

A still further object of the invention is to provide a seal assembly of the type mentioned in the preceding paragraph with a spring structure which will perform a double function and eliminate the necessity of a second spring and abutment items, thus reducing the size and total number of parts of the assembly.

Other objects and advantages of the invention will be obvious and/or specifically pointed out in the following description of one embodiment of the invention disclosed in detail in the accompanying drawing.

IN THE DRAWING

DESCRIPTION OF THE DISCLOSURE

Figure 1:
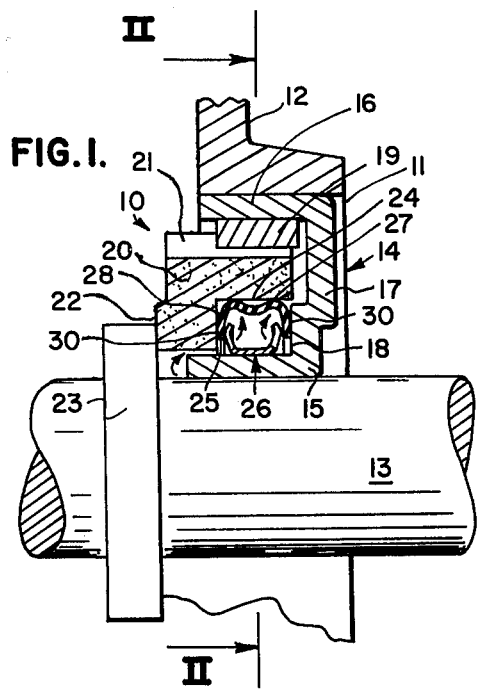
FIG. 1 is an axial sectional view of a seal assembly formed in accordance with the present invention and mounted in a casing wall to close an opening around a shaft extending therethrough.
Figure 2:
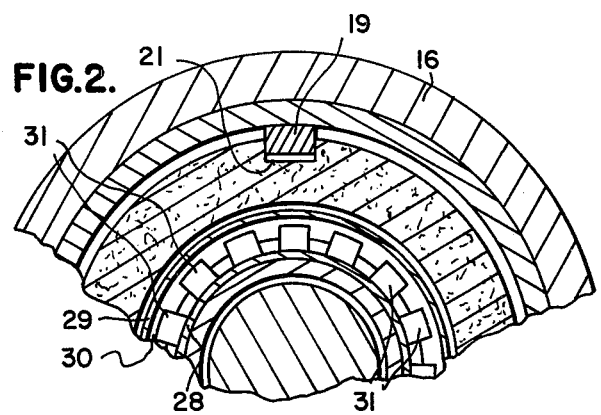
FIG. 2 is a vertical transverse sectional view taken through the seal shown in FIG. 1 on the plane indicated by the line II—II of that Figure.

Referring more particularly to the drawing and especially to FIG. 1, the numeral 10 designates a seal assembly formed in accordance with the invention. This seal assembly has been provided to close an opening 11 in wall 12 through which a rotatable shaft 13 projects. As is well known in the mechanical field, it is a difficult task to prevent leakage of liquids, gases, or lubricants around a shaft, particularly in a location where the wall is a part of a pressurized housing. The seal assembly 10 includes a casing 14 having inner and outer concentric walls 15 and 16, respectively, and an end wall 17, which collectively form the casing 14 with an open end. A portion of the wall 17 is offset adjacent the inner wall 15 to form a shoulder 18 which is smoothly finished for a purpose to be set forth hereinafter. The outer wall 16 has a plurality of lugs 19 spaced therearound, these lugs being suitably permanently secured to the casing.

The casing receives a primary sealing element 20 which, in this instance, is composed of a ring of carbonaceous material sized to slide into the open end of the casing 14. The peripheral side of the ring has spaced grooves 21 formed therein to receive the lugs 19 which serve to hold the ring against rotation and guide it for movement into and out of the casing. The ring 20 has a slightly raised sealing face 22 on the side projecting from the casing, this face also being smoothly finished for sliding engagement with a collar or enlargement 23 formed on shaft 13. This smooth sliding engagement provides the primary sealing contact.

Ring 20 is counterbored, as at 24, to provide a smooth continuous shoulder 25, which, when the ring is in place in the casing, is disposed in space opposed relation to the shoulder 18 on the casing end wall 17. The space between the shoulders 18 and 25, the inner wall of the casing, and the inner wall of the counterbored portion of the ring 20 form a chamber for receiving the secondary sealing element 26 of the seal assembly.

In the first form of the invention illustrated, the sealing element 26 includes two parts, 27 and 28. Part 27 comprises an annulus having a substantially channel-shaped cross section with an outer wall 29 and end flanges or flaps 30. Element 27 is made from polytetrafluoroethylene or other suitable plastic which provides desirable flexibility, resistance to heat and distortion, and long life. The outer wall 29 may be transversely undulated, if desired, to allow limited movement of the end flanges or flaps toward and away from one another. Such movement will permit the primary seal to move slightly and accommodate variations in shaft positions or wear. Such movement also permits the flaps to maintain a sealing engagement with shoulders 18 and 25 on the casing 14 and primary seal ring 20. Initially, flaps 30 are urged into engagement with the shoulders 18 and 25 by part 28.

Part 28 is a resilient or spring member disposed in the channel of part 27. The spring 28 is also an annulus with an inner wall and a series of spaced spring fingers 31 projecting outwardly and upwardly from the side edges of the inner wall. It will be obvious that the strength of the spring may be controlled by the selection of material, the number and pitch of the fingers 31, the stock thickness, the stresses, and other normal spring design considerations. The spring fingers engage the flaps and urge them outwardly into engagement with shoulders 18 and 25. This force reacts on the primary sealing ring 20 to yieldably resist movement thereof by the shaft into casing 14. Fluid under pressure within the housing, of which wall 12 forms a part, flows between ring 20 and inner wall 15 of casing 14 and is applied to the inner surface of plastic part 27 of sealing element 26. The pressure of this fluid tends to spread the flaps 30 farther apart and increase the engagement thereof with the shoulders 18 and 25. This engagement prevents the escape of fluid around the primary sealing element while permitting limited axial movement thereof in response to shaft creep or variation in position.

The spring 28 serves a second purpose in tending to urge the primary sealing element 20 outwardly of the casing 14 to maintain the element of the face 22 thereof with the collar 23 on the shaft 13. As previously mentioned, spring 28 yieldably resists movement of element 20 inwardly into the casing 14, thus eliminating the use of washers and wave springs employed for such purpose in conventional seals.

From the foregoing it will be apparent that the construction of the secondary sealing element shown and described provides sealing operations in an axial direction at the smallest diametral dimension on the plastic element, thus minimizing the effect of the expansion rate of the material. Through the dual functions of the spring 28, a reduction in the total number of parts in the seal assembly, as well as axial length thereof, is secured.

It will be clear to those familiar with the art that the configuration of the static sealing element may vary depending upon the required operating range.

Figure 4:
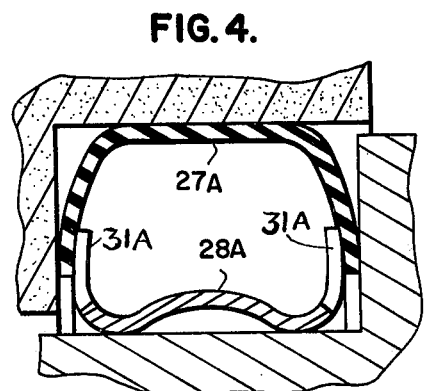
FIG. 4 is a sectional view similar to FIG. 3 showing a slightly modified form of secondary seal embodying the features of the invention.

FIG. 4 shows a slightly modified form of secondary seal. In this form, the plastic part 27A has a similar channel-shaped cross section but the undulating transverse shape is not utilized. The resilient initial expander 28A is modified by providing the annular wall section thereof with an undulating cross section to lend additional resiliency and, if desired, greater expansion. The side edges of the resilient member 28A also has spring fingers 31A like those in the form of the invention first described.

Figure 3:
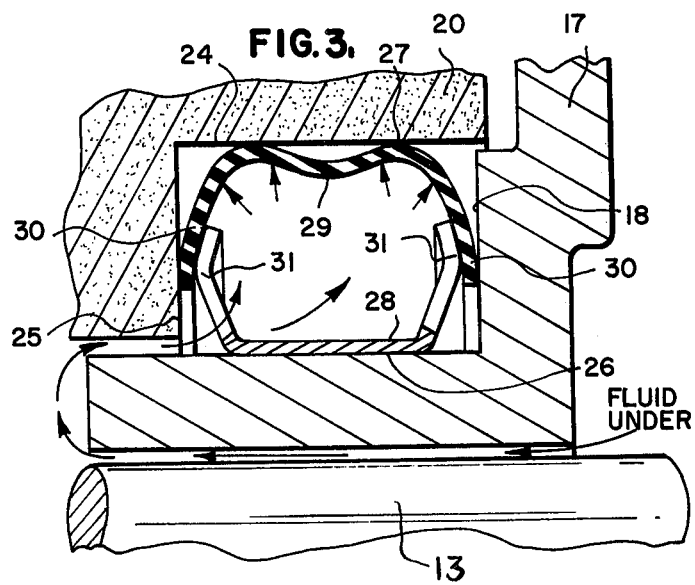
FIG. 3 is an enlarged sectional view of a secondary sealing element forming a part of the seal assembly shown in FIG. 1.

It is obvious that the form of plastic element 27 shown in FIG. 3 could be used with the form of spring shown in FIG. 4, or vice versa if so desired.

The principles of operation are the same in both forms of the invention shown and described.

I claim:
1. Rotary seal means comprising:
    a. a casing having spaced concentric inner and outer walls connected by an end wall and providing an annular chamber open at one end, said end wall having a continuous shoulder adjacent the inner wall;
    b. an annular primary sealing element disposed in said chamber, said sealing element having a sealing face exposed at the open end of said casing and a continuous shoulder in spaced opposed relation to the shoulder in said casing;
    c. an annular secondary sealing element disposed between said opposed shoulders, said secondary sealing element having spaced flaps connected by an annular wall and movable toward and away from one another, said flaps having a sealing engagement with the opposed shoulders on said casing and primary sealing element; and
    d. a spring disposed between the flaps of the secondary sealing element to urge said flap toward said shoulders, said spring engaging said inner wall to yieldably resist radial inward movement of said secondary sealing element in said chamber.

2. The rotary seal means of claim 1 in which means are provided to prevent relative rotation of said casing and the primary sealing element.

3. The rotary seal means of claim 2 in which the means for preventing relative rotation between the casing and primary sealing element provides for relative axial movement therebetween.

4. The rotary seal means of claim 1 in which the spaced flaps project generally inwardly from the annular wall.

5. The rotary seal means of claim 1 in which the secondary sealing element is composed of a plastic material.

6. The rotary seal means of claim 1 in which the secondary sealing element is formed of polytetrafluoroethylene.

7. Rotary seal means comprising:
    a. a casing having spaced concentric inner and outer walls connected by an end wall and providing an annular chamber open at one end, said end wall having a continuous shoulder adjacent the inner wall;
    b. an annular primary sealing element disposed in said chamber, said sealing element having a sealing face exposed at the open end of said casing and a continuous shoulder in spaced opposed relation to the shoulder in said casing; and
    c. an annular secondary sealing element disposed between said opposed shoulders, said secondary sealing element having spaced flaps connected by an annular wall and movable toward and away from one another, said flaps having a sealing engagement with the opposed shoulders on said casing and primary sealing element, said spaced flaps projecting generally inwardly from the annular wall, and said annular wall being provided with transversely spaced undulations which form alternate annular ridges and grooves.

8. Rotary seal means comprising:

a. a casing having spaced concentric inner and outer walls connected by an end wall and providing an annular chamber open at one end, said end wall having a continuous shoulder adjacent the inner wall;

b. an annular primary sealing element disposed in said chamber, said sealing element having a sealing face exposed at the open end of said casing and a continuous shoulder in spaced opposed relation to the shoulder in said casing;

c. an annular secondary sealing element disposed between said opposed shoulders, said secondary sealing element having spaced flaps connected by an annular wall and movable toward and away from one another, said flaps having a sealing engagement with the opposed shoulders on said casing and primary sealing element, said flaps projecting generally inwardly from the annular wall; and d. spring means disposed between the spaced flaps to urge said flaps towards said shoulders, said spring means having an annular band and spaced resilient fingers projecting from the sides of the band in spaced order to engage the flaps on the secondary sealing element.

9. The rotary seal means of claim 8 in which the resilient fingers project generally radially outwardly from the band of the spring means.

10. The rotary seal means of claim 8 in which the annular band of said spring means is provided with transversely spaced undulations which form alternate annular ridges and grooves.

11. The rotary seal means of claim 8 in which the annular wall of the secondary sealing means is provided with transversely spaced undulations which form alternate annular ridges and grooves and the annular band of the spring means is provided with transversely spaced undulations which form alternate annular ridges and grooves.

12. Rotary seal means comprising:

a. a casing having spaced concentric inner and outer walls connected by an end wall and providing an annular chamber open at one end, said end wall having a continuous shoulder adjacent the inner wall;

b. an annular primary sealing element disposed in said chamber, said sealing element having a sealing face exposed at the open end of said casing and a continuous shoulder in spaced opposed relation to the shoulder in said casing;

c. an annular secondary sealing element disposed between said opposed shoulders, said secondary sealing element having spaced flaps connected by an annular wall and movable toward and away from one another, said flaps having a sealing engagement with the opposed shoulders on said casing and primary sealing element; and d. spring means disposed between the spaced flaps to urge said flaps toward said shoulders, said spring means having an annular band and spaced resilient fingers projecting from the sides of the band in spaced order to engage said flaps.

13. Rotary seal means comprising:

a. a casing having spaced concentric inner and outer walls connected by an end wall and providing an annular chamber open at one end, said end wall having a continuous shoulder adjacent the inner wall;

b. an annular primary sealing element disposed in said chamber, said sealing element having a sealing face exposed at the open end of said casing and a continuous shoulder in spaced opposed relation to the shoulder in said casing;

c. an annular secondary sealing element disposed between said opposed shoulders, said secondary sealing element having spaced flaps connected by an annular wall and movable toward and away from one another, said flaps having a sealing engagement with the opposed shoulders on said casing and primary sealing element; and d. spring means disposed between the spaced flaps to urge said flaps toward said shoulders, said spring means including an annular band having transversely spaced undulations which form alternate annular ridges and grooves.

* * * * *